United States Patent [19]
Motz et al.

[11] 3,738,140
[45] June 12, 1973

[54] GEAR ROLLING MACHINE

[75] Inventors: Carl H. Motz; Russell W. Anthony, both of Harper Woods; George C. Peterson, Grosse Pointe Park, all of Mich.

[73] Assignee: Lear Siegler, Inc., Santa Monica, Calif.

[22] Filed: July 6, 1971

[21] Appl. No.: 159,733

[52] U.S. Cl................... 72/94, 29/159.2, 72/108
[51] Int. Cl.............................. B21h 5/02
[58] Field of Search.............. 72/94, 108, 109, 72/111, 421, 434; 29/159.2; 267/75, 150

[56] References Cited
UNITED STATES PATENTS
3,552,167  1/1971  Bregi et al. ............................ 72/94
3,631,704  1/1972  Leonard et al. .................. 29/159.2

Primary Examiner—Lowell A. Larson
Attorney—Charles R. McKinley, L. Gaylord Hulbert, Donald P. Bush et al.

[57] ABSTRACT

A gear rolling machine comprising a frame, a stationary die support on the frame for a gear rolling die, a work support slidable on said frame toward and away from said stationary die support, and a movable die support mounted on the frame for movement toward and away from the stationary die support and parallel to the movement provided for the work support. Yieldable means, such for example as a spring, counterweight, fluid pressure, or the like, are provided urging the work support toward the stationary die support. The movable die support is connected by lost motion means, preferably associated with yieldable means, to the work support and operates after completion of a gear rolling operation to move the work support away from the stationary die support into a clearance condition between the die and a work gear on the work support.

11 Claims, 3 Drawing Figures

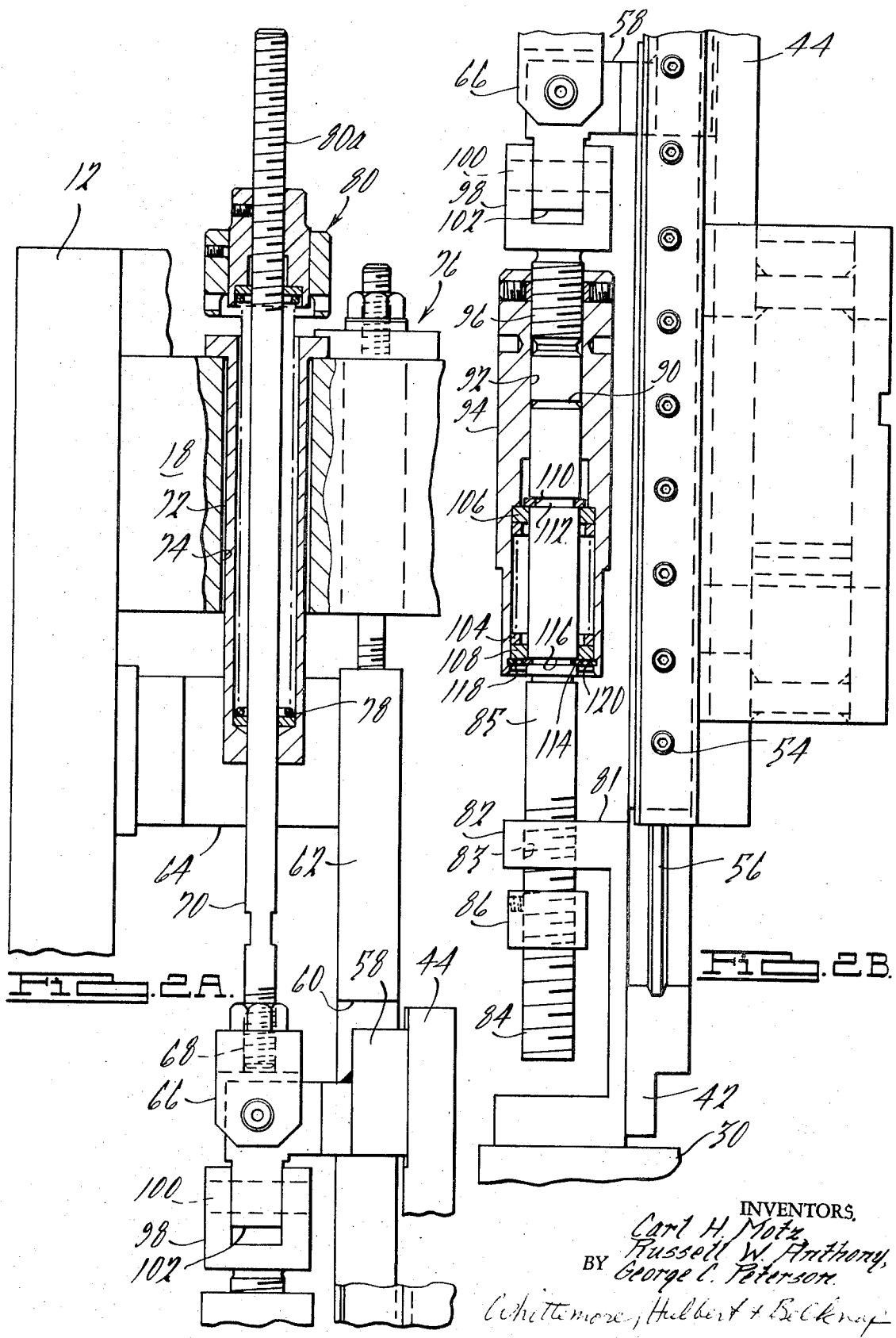

3,738,140

GEAR ROLLING MACHINE

BRIEF SUMMARY OF THE INVENTION

In the finishing of work gears by rolling them in mesh with one or more gear-like dies, a usual arrangement is to provide two dies one of which is fixed and the other of which is movable toward and away from the stationary die. A work support is provided which positions a work gear intermediate the gear-like dies and adapted to mesh therewith preferably in parallel axes relationship, while relatively great pressure is applied to the movable die while the dies and gear are rotated, to finish the teeth of the work gear.

In the past, constructions were provided in which positive mechanical means effected a movement of the work gear toward the stationary gear by an amount equal to one-half of the movement of the movable die toward the stationary die. It has been found that this arrangement is not only unnecessary but is actually undesirable as interferring to some extent with the free floating centralization of the work gear intermediate a pair of opposed relatively movable gear-like dies.

In accordance with one embodiment of the present invention, a work support is mounted on the frame of the machine and is associated with resilient or yieldable means such for example as springs, a counterweight, a fluid cylinder, or the like, sufficient to apply a force to the work support capable of moving the work support toward the support for the stationary die in order to maintain a work gear in tight mesh with the stationary die.

Mounted on the frame of the machine is a knee which carries the second rotatable gear-like die which is adapted to mesh with the teeth of the work gear and to apply pressure to the work gear between the two relatively movable dies. The relatively great force required to perform the gear rolling operation is conveniently applied by means of a hydraulic piston and cylinder device acting on the knee and effective to move the knee in a direction to cause the die carried thereby to engage the work gear and to cooperate with the stationary die to apply opposing pressures to the gear as the gear and dies are rotated.

Upon completion of a gear rolling operation the knee is moved away from the stationary die support and moves the movable die out of mesh with the work gear. However, it is necessary to provide a positive connection between the knee and work support to draw the finished work gear out of mesh with the stationary die. This is accomplished by a lost motion connection between the knee and work support in association with resilient means so that upon predetermined movement of the knee the work support will be moved sufficiently to draw the work gear thereon out of mesh with the stationary die. The resilient means permits the work support to be moved into an exactly predetermined position to coact properly with suitable loading mechanism when the knee is withdrawn to its initial position.

BRIEF DESCRIPTION OF THE DRAWINGS

FIGS. 2A and 2B are fragmentary enlarged views of the means interconnecting the frame, movable work support, and movable die.

DETAILED DESCRIPTION

Figure 1:
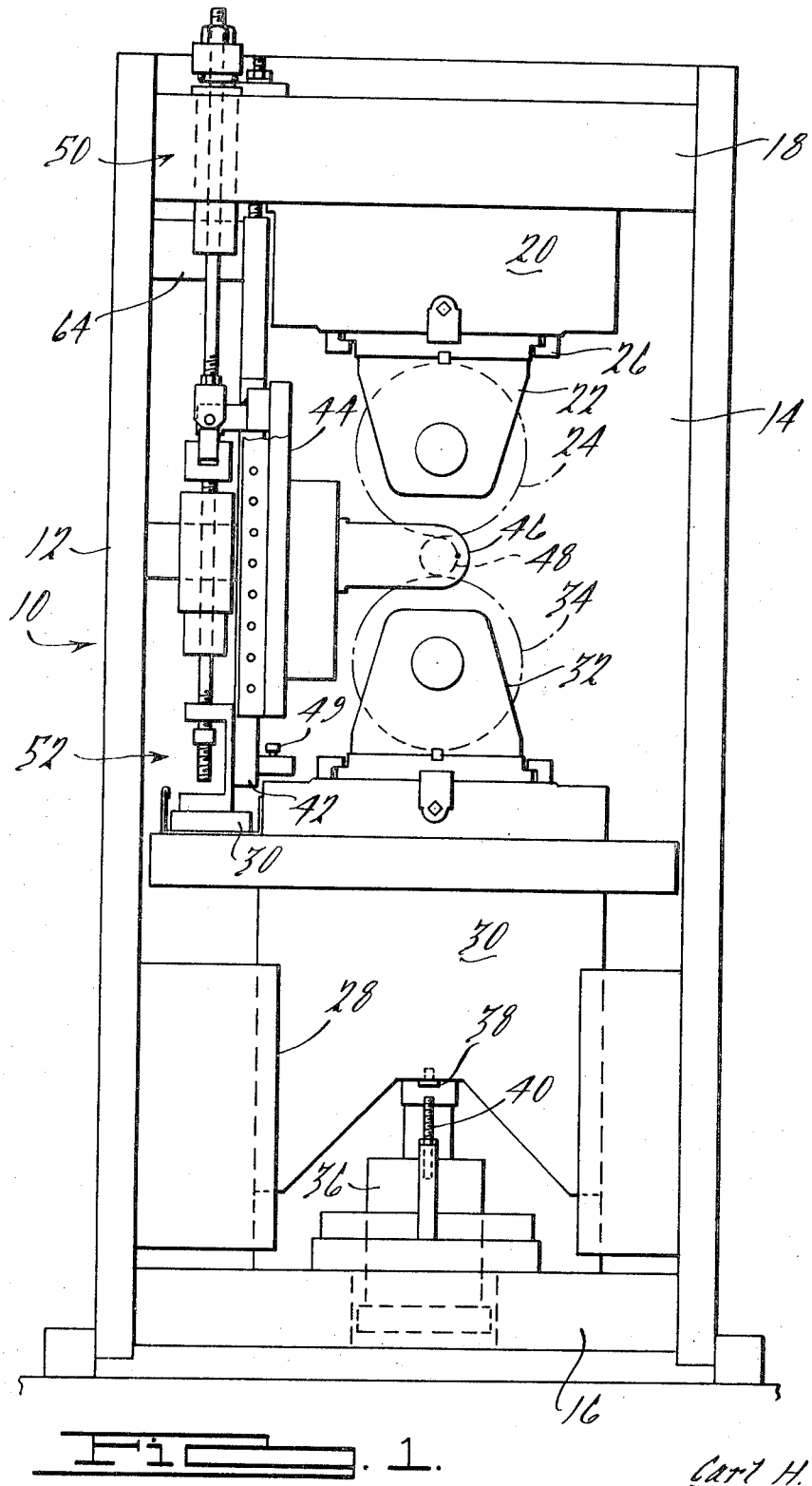
FIG. 1 is a simplified side elevation of the gear rolling machine.

Referring first to FIG. 1 the gear rolling machine comprises a frame indicated generally at 10 having a vertically extending back plate 12, and vertically extending side plates one of which is indicated at 14. A base 16 is provided and is associated with a horizontally extending top support plate 18.

Mounted on the top support plate 18 is a stationary die support 20 having stocks 22 between which a rotatable gear-like die 24 is provided.

Means are provided for rotating the dies in timed relation in mesh with the gear and conveniently, this means (not shown) may be as disclosed in Bregi et al U.S. Pat. No. 3,552,167.

While the dies and work gears are normally operated with their axes parallel or substantially parallel, means 26 are provided which permit slight angular adjustment of the upper stationary die 24 as well as the lower die if desired.

Mounted on ways indicated at 28 on the frame is a knee 30 having a pair of stocks 32 between which a movable gear-like die 34 is mounted for rotation. Means are provided for effecting vertical movement of the knee 30 and this comprises a hydraulic cylinder 36 having a piston therein connected to the knee. Adjustable abutment means including a stop button 38 and adjustable abutment screw 40 are provided to locate the knee 30 in its lowermost position.

Vertically movable on ways 42 on the frame is a work support slide 44, the slide having forwardly extending work support means 46 between which a work gear 48 is journaled, and is adapted to be engaged in tight mesh by the dies 24 and 34.

Means indicated generally at 50 are provided for biasing the work slide 44 upwardly and lost motion means indicated generally at 52 are provided for obtaining the required relative motion between the knee 30 and the work support 44. Details of the structure illustrated generally in FIG. 1 at 50 and 52 is best illustrated in FIGS. 2A and 2B, to which reference is now made.

The work slide 44 is preferably provided with ball or roller bearings as indicated at 54, movable in races 56 to facilitate vertical movement of the work support 44. Extending rearwardly from the work support 44, adjacent its upper end as best seen in FIG. 2A, is a rigid bracket 58 vertically movable through a slot 60 provided in a stationary frame plate 62 mounted to the back plate 12 by rigid brackets 64. Connected to the bracket 58 is a clevis 66 fixedly secured by a threaded connection 68 to the lower end of a balance rod 70. The balance rod 70 extends upwardly through a spring housing 72 fixedly secured in an opening 74 in top plate 18 by clamping means indicated generally at 76. Within the housing 72 is a coil compression spring 78 the lower end of which engages the bottom of the housing 72 and the upper end of which engages a nut assembly 80 connected to the threaded upper end 80a of the balance rod. Accordingly, the spring 78 urges the balance rod 70 upwardly and this force is applied to the work support 44. The strength of the spring 78 is selected such that it is effective to overbalance the weight of the work support 44 so that the work support is moved upwardly by spring action when permitted until its upward movement is arrested by engagement between a work gear 48 carried by the work support and the upper stationary die 24.

Upon completion of a gear rolling operation, hydraulic pressure is reversed in the cylinder 36 and the knee 30 is moved downwardly to move the lower die 34 out of mesh with the work gear 48. At this time the work support 44 remains stationary and the work gear 48 remains in mesh with the die 24. However, to provide for automatic unloading and loading of work gears, it is desirable to move the work support 44 downwardly to a position such that the finished work gear is in substantial clearance with respect both to the lower die 34 and the upper die 24.

Fixedly mounted on the knee is a C-shaped bracket 81 having an upper arm 82 provided with an opening 83 through which extends the lower threaded end portion 84 of a coupling rod 85. Below the arm 82 is an adjustable abutment nut 86 which is engaged by the underside of the arm 82 after predetermined downward movement of the knee 30, following a gear rolling operation.

The upper end of the coupling rod 85 indicated at 90 is slidably received in an elongated bore 92 provided in a spring capsule 94.

The upper end of the capsule 94 has a threaded connection indicated at 96 with a clevis 98 connected by a pin 100 to a depending arm 102 on the bracket 58.

Within the lower end of the spring capsule 94 there is provided a relatively strong compression spring 104 positioned between vertically slidable spring seats 106 and 108, the spring seats normally being engaged by an upper snap ring 110 received in a groove 112 formed in the rod 85 and a lower snap ring 114 received in a groove 116 formed in the rod 85. Spring seat 106 as seen in FIG. 2B also engages a downwardly facing shoulder in the chamber in the capsule 94 which receives the spring 104. In addition, a snap ring 118 is received within an internal groove 120 provided within the lower end of the capsule 94, the snap ring 118 also engaging the annular spring seat 108 under certain conditions.

With the foregoing construction it will be observed that a predetermined downward movement of the knee 30 will cause the arm 82 to engage the adjustable abutment nut 86, and further downward movement of the knee will draw the rod 85 downwardly. At this time the relatively strong compression spring 104 will maintain the rod 85 without relative movement to the capsule and will draw the work support 44 downwardly against the opposing force of the spring 78. Accordingly, the initial movement of the knee 30 moves the lower die 34 downwardly out of mesh with the finished work gear 48 and thereafter, draws the work gear downwardly out of mesh with the upper die 24, thus leaving the work gear 48 in clearance and in position to cooperate with automatic loading and unloading mechanism.

In order for the work support to cooperate properly with automatic loading mechanism, it is essential for the work support 44 to move downwardly into a precisely predetermined position and accordingly, a suitable abutment such as indicated diagrammatically at 49 is provided which is engaged after predetermined downward movement of the work support 44.

In order that this stoppage of the work support can take place independently of termination of downward movement of the knee 30, the spring capsule 94 permits downward movement of the coupling rod 85 after movement of the work support 44 has been terminated. This downward movement of the rod 85 causes the snap ring 112 to move the upper spring seat 106 downwardly within the capsule.

AFter a work gear has been removed from the machine and replaced with a new gear to be finished, upward movement of the knee reverses the actions just described and permits the spring 78 to move the work support upwardly to mesh the work gear with the upper die 24, after which the knee continues upward movement, moving the arm 82 out of engagement with the abutment nut 86 and bringing the lower die 34 into tight mesh with the work gear. During the gear rolling operation, metal is displaced on the teeth of the work gear accordingly, there will be a slight but definite further upward movement of both the work gear and the lower die 34. The spring 78 thus cooperates to permit the work gear to float freely between the upper and lower dies so that each of the dies contributes substantially equally to the finished operation.

In the foregoing illustrated and described embodiment of the invention, the bias spring 78 is assumed to be adjusted to exert a force sufficient to overcome the weight of the work slide 74 so that unless restrained the work support moves upwardly until a work gear thereon engages the die on the upper stationary support or until arrested by suitable motion limiting means. However, the invention may be practiced with the compression spring 78 adjusted so that it counterbalances some but not all of the weight of the vertically movable work support. In other words, unless other forces are applied to the work support or the work gear, it will move downwardly by gravity until its movement is arrested by the adjustable abutment 49 or by engagement between the work gear and the die on the movable die support.

With this arrangement it will be observed that after downward movement of the work support has been arrested by the abutment 49, the lower die support may move further downwardly to a position such that the gear-like die thereon moves out of mesh with the work gear.

After a finished work gear has been removed and replaced by an unfinished work gear, the movable die is moved upwardly until the die thereon engages with the work gear. At this time the die and work gear become fully meshed and are rotated by a driving connection to the lower die roll, all as disclosed in Bregi et al U.S. Pat. No. 3,552,167. Accordingly, the work gear at this time is being rotated in properly timed relation to mesh with the upper rotatable die, which is being rotated in synchronism with the lower die. The foregoing remarks apply generally to the embodiment of the invention as initially described, in which the spring means urges the work support upwardly to engage the work piece with the upper die before it is engaged by the lower die.

In both cases therefore, meshing of the work with the dies is facilitated since the work is required to enter into meshing engagement with a single rotating die in the first instance. Thereafter, while the work is rotated synchronously and in suitably timed relation to insure proper meshing, it is moved into engagement with the other rotating die.

In the above described embodiment of the invention, the movable supports move vertically and are hence influenced by gravitational forces. The spring means 78, as previously noted, is adjustable so that the result force applied to the movable work support is effective to move the work support either upwardly or downwardly as desired. In any case however, the resultant bias forces representing the difference between gravitational forces and spring forces are only sufficient to insure movement of the work support into tight mesh with one of the dies prior to engagement of the other die therewith. Such forces are only a small fraction of the forces applied by the dies to the gear during the rolling operation.

What we claim as our invention is:

1. A gear rolling machine comprising a frame,
a stationary die support on said frame having a rotatable gear rolling die thereon,
a movable die support on said frame having a second rotatable gear rolling die thereon,
means mounting said movable die support on said frame for movement toward and away from said stationary support,
means acting between said frame and movable die support to move said movable die support toward said stationary support to a working position to apply gear rolling pressure to a work gear interposed between said dies and to move said movable die support away from said stationary support to a loading position for loading and unloading work gears,
a work support for mounting a work gear for rotation between said dies,
means mounting said work support on said frame for movement toward and away from said stationary support between a working position in which the work gear is in tight mesh with the die carried by said stationary support and a loading position in which a gear carried thereby is out of mesh with both of said dies,
actuating means operatively associated with said work support operable upon initial movement of said movable die support from loading position toward working position to move said work support toward said stationary die support to mesh the work gear with the die on said stationary die support while the gear remains spaced substantially from the die carried by said movable die support, and operable thereafter during final movement of said movable die support to working position to maintain the gear on said work support in tight mesh with the die on said stationary die support, said work support being substantially freely movable between said die supports to positions determined by engagement between the work gear and said dies,
and means for positively rotating both of said dies in accurately timed relation during the aforesaid relative movements between said supports whereby the gear is driven in accurately timed relation by the die on said stationary die support as the die on said movable die support is moved into mesh with the gear.

2. A machine as defined in claim 1 in which the actuating means operatively associated with the work support is constructed and arranged to provide a resultant force effective to provide tight mesh at a pressure much less than rolling pressure applied during the rolling operation.

3. A machine as defined in claim 1 in which the actuating means operatively associated with the work support comprises spring means.

4. A machine as defined in claim 3 in which said spring means is effective to move said work support toward said stationary die support, said actuating means further comprising lost motion connecting means acting between said work support and movable die support to move said work support against said spring means only after said movable die support has moved the die carried thereby out of mesh with the gear on said work support.

5. A machine as defined in claim 3 in which said spring means is effective to provide a resultant bias to move said work support toward said movable die support, and abutment means acting between said frame and work support to arrest said work support while said movable die support continues to move toward loading position to disengage the die carried thereby from the work gear.

6. A machine as defined in claim 3 in which said movable supports are movable vertically.

7. A machine as defined in claim 6 in which said spring means is adjustable to provide forces which may be selected as greater or less than gravitational forces on said movable work support.

8. A machine as defined in claim 4, said movable supports being movable vertically, said stationary die support being above said movable die support, said spring means being effective to move said work support upwardly against gravitational forces, and abutment means acting between said frame and movable work support to arrest said work support during continued downward movement of said movable die support.

9. A machine as defined in claim 8 comprising yieldable means coupling said lost motion means to said work support to provide for termination of movement of said work support while permitting additional movement of said movable die support.

10. A machine as defined in claim 9 in which said yieldable means comprises a coupling rod, a spring capsule in which said coupling rod is longitudinally slidable, a compression spring in said capsule, spring seats slidable on said rod, means on said rod limiting movement of said spring seats in a direction away from each other, abutment means in said capsule engageable with said spring seats and operable to permit movement of said rod in said capsule upon the application of forces sufficient to overcome pre-compression of said spring.

11. A gear rolling machine comprising a frame,
a stationary die support on said frame having a rotatable gear rolling die thereon,
a movable die support on said frame having a second rotatable gear rolling die thereon,
means for positively rotating both of said dies in accurately timed relation,
means mounting said movable die support on said frame for movement toward and away from said stationary support,
a work support for mounting a work gear for rotation between dies carried by said die supports,
means mounting said work support on said frame for movement toward and away from said stationary support between a working position in which the work gear is in tight mesh with the die carried by said stationary support and a loading position in which a gear carried thereby is out of mesh with dies carried by said die supports, and means connected to said movable die support and said work support for relatively moving said movable die support and said work support to move said work support initially to mesh the work gear with the rotating die on said stationary die support and thereafter move the rotating die on said movable die support into mesh with the gear while the gear is being rotated in properly timed relation with respect to the die on the movable die support by its meshed engagement with the rotating die on said stationary die support.

* * * * *